United States Patent
Lee et al.

(10) Patent No.: US 8,472,876 B1
(45) Date of Patent: Jun. 25, 2013

(54) METHODS AND SYSTEMS FOR PRESENTING THE TIME OF THE MOST RECENTLY DETECTED PRESENCE OF A PERSONAL AREA NETWORK DEVICE

(75) Inventors: Woojae J. Lee, Manhattan, KS (US); Cesar Perez, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 652 days.

(21) Appl. No.: 12/571,101

(22) Filed: Sep. 30, 2009

(51) Int. Cl.
*H04B 7/00* (2006.01)

(52) U.S. Cl.
USPC ............... 455/41.2; 455/404.2; 455/456.1; 455/556.2; 455/575.1; 455/575.9; 455/410; 340/539.23; 340/539.11; 340/573.1

(58) Field of Classification Search
USPC ....... 455/41.2, 404.2, 456.1, 456.2, 410–411, 455/556.2, 457, 575.1, 575.2, 575.9; 340/539.23, 539.11, 573.1
See application file for complete search history.

(56) References Cited

U.S. PATENT DOCUMENTS

| | | | |
|---|---|---|---|
| 5,519,760 A | 5/1996 | Borkowski et al. | |
| 6,330,454 B1 | 12/2001 | Verdonk | |
| 6,563,427 B2 * | 5/2003 | Bero et al. | 340/573.1 |
| 7,301,448 B1 * | 11/2007 | Usery et al. | 340/506 |
| 7,317,927 B2 * | 1/2008 | Staton et al. | 455/456.4 |
| 7,366,492 B1 * | 4/2008 | Ganesh | 455/404.2 |
| 7,400,229 B2 * | 7/2008 | Boss et al. | 340/309.16 |
| 7,706,369 B2 * | 4/2010 | Roese et al. | 370/389 |
| 7,848,704 B2 * | 12/2010 | Smith | 455/41.2 |
| 7,876,205 B2 * | 1/2011 | Catten et al. | 340/439 |
| 7,916,071 B2 * | 3/2011 | Harper | 342/357.31 |
| 7,973,657 B2 * | 7/2011 | Ayed | 340/539.23 |
| 8,045,922 B2 * | 10/2011 | Sherman et al. | 455/41.2 |
| 8,045,961 B2 * | 10/2011 | Ayed et al. | 455/411 |
| 8,073,463 B2 * | 12/2011 | Islam et al. | 455/456.1 |
| 8,115,609 B2 * | 2/2012 | Ketari | 340/426.16 |
| 8,160,603 B1 * | 4/2012 | Bertz et al. | 455/452.2 |
| 8,266,233 B1 * | 9/2012 | Roka et al. | 709/207 |
| 2003/0212646 A1 * | 11/2003 | Horvitz | 706/46 |
| 2005/0059347 A1 * | 3/2005 | Haartsen | 455/41.2 |
| 2006/0199534 A1 | 9/2006 | Smith | |
| 2007/0083872 A1 * | 4/2007 | Doshi | 719/318 |

(Continued)

OTHER PUBLICATIONS

Ryan Woodings et al., Rapid Heterogeneous Connection Establishment: Accelerating Bluetooth Inquiry Using IrDA, p. 1-14, retrieved from http://faculty.cs.byu.edu/~knutson/publications/IrDA_Assisted_BT_Discovery.pdf, on Apr. 27, 2009.

(Continued)

*Primary Examiner* — Marceau Milord

(57) ABSTRACT

Methods and systems are provided for determining the absence of a personal area network (PAN) device and for responsively presenting the time of the last detected presence of the PAN device. In an exemplary embodiment, a PAN device encounters a triggering event and responsively checks and determines that another PAN device is absent. Upon detecting the absence of the other PAN device (such as by detecting an absence of communication from the other PAN device), the exemplary PAN device presents via a user interface an indication of the time that it last detected presence of the other PAN device. By presenting the time of the last detected presence of the other PAN device, the user of the PAN device may be able to recall where he or she was at that time, which may help the user find the misplaced PAN device, hopefully at that location.

21 Claims, 5 Drawing Sheets

U.S. PATENT DOCUMENTS

| | | | |
|---|---|---|---|
| 2008/0057910 A1* | 3/2008 | Thoresson et al. | 455/412.1 |
| 2008/0123610 A1* | 5/2008 | Desai et al. | 370/339 |
| 2008/0125040 A1 | 5/2008 | Kalayjian | |
| 2009/0034498 A1* | 2/2009 | Banerjea et al. | 370/338 |

OTHER PUBLICATIONS

Mercedes Benz, Bluetooth Telephony Supplement, p. 1-5, retrieved from internet on Nov. 14, 2008, URL now unknown.

Michael Oryl, Review of Sony Ericsson's MBW-150 Bluetooth Watch, first retrieved from http://www.mobileburn.com/review.jsp?Id=5203, on Sep. 5, 2008, printed from internet on Sep. 29, 2009.

eBay, BlueAnt Micro X3 Headsets—Frequently Asked Questions, retrieved from http://reviews.ebay.com/BlueAnt-Micro-X3-Headsets-Frequently-Asked-Questions__W0QQugid Z10000000003679709, on Nov. 14, 2008, created on Jun. 3, 2007 (updated Apr. 8, 2008).

PDAPhoneHome.com, PDAPhoneHome.com > Pocket PC PDAPhones > Samsung SCH-i760 > Icon indicating bluetooth connected on Today screen?, retrieved from http://pdaphonehome.com/forums/samsung-sch-i760/99090-icon-indicating-bluetooth-connected-today-screen.html, on Nov. 14, 2008.

* cited by examiner

| DEVICE ID | TIME OF MOST RECENT PRESENCE | LOCATION OF MOST RECENT PRESENCE | BATTERY LEVEL AT MOST RECENT PRESENCE |
|---|---|---|---|
| 0x11413D4F0B54 | 6/1/2009 7:55 am | 27° 59' 17" N, 86° 55' 31" E | 98% |
| 0x5CCAEDE7AE08 | 5/29/2009 5:56 pm | 31° 20' 0" N, 35° 30' 0" E | 7% |
| 0x415E3F72EA97 | 6/1/2009 7:56 am | | |

Fig. 3

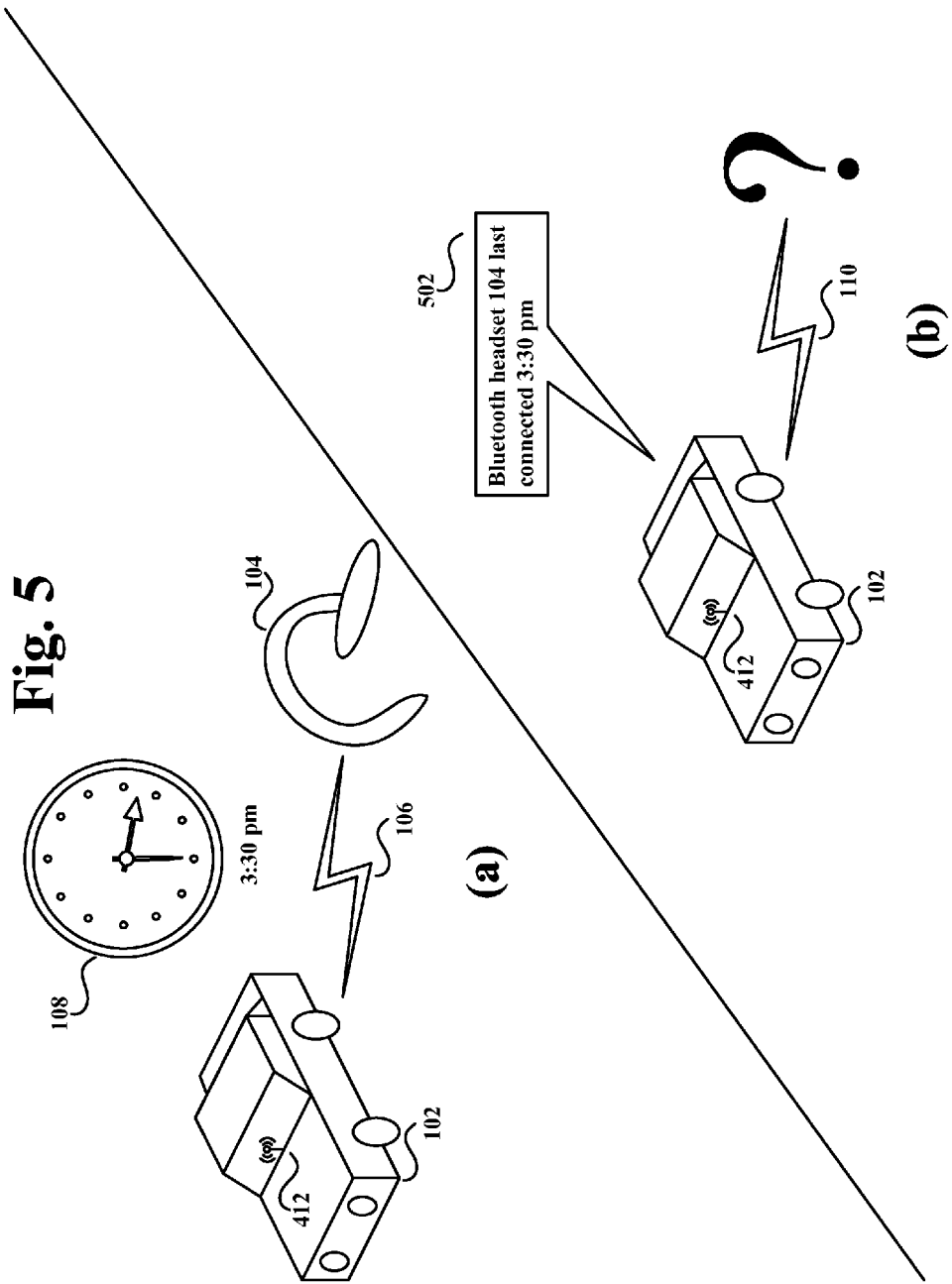

METHODS AND SYSTEMS FOR PRESENTING THE TIME OF THE MOST RECENTLY DETECTED PRESENCE OF A PERSONAL AREA NETWORK DEVICE

BACKGROUND

A network of computers or other devices can span a variety of distances. One type of network, a wide area network (WAN), connects networked devices across great distances, perhaps in different cities or even in different countries. An example of a WAN is the Internet. Another type of network, a local area network (LAN), connects devices within a building or a campus of buildings, for example.

Yet another type of network, a personal area network (PAN), connects networked devices across relatively short distances. A PAN may connect devices within an area the size of a single room of a building or bigger, or perhaps a smaller area such as a few feet or meters. As an example, a PAN may consist of a computer networked with a printer and a scanner. A PAN may even connect devices worn on a person. For example, a PAN may consist of a mobile phone (perhaps in jacket pocket) networked with a wireless headset (likely worn on the person's ear).

Any device can be a PAN device so long as it is able to communicate with other devices that are in relatively close proximity to the PAN device. In addition to the devices mentioned above, MP3 players and personal digital assistants can be PAN devices. Even devices not conventionally thought of as networked devices can be PAN devices. For instance, an automobile can be a PAN device, and even a pair of eyeglasses can be PAN device, if these devices are configured to communicate over short distances with other PAN devices.

PAN devices can communicate with other PAN devices wirelessly and/or over a wired network, and to facilitate this communication, several PAN protocols have been developed. Examples of wired PAN protocols include Universal Serial Bus (USB) and FireWire, and examples of wireless PAN protocols include Bluetooth and ZigBee. The Bluetooth protocol is a widely implemented PAN protocol, and is used by numerous mobile PAN devices, including mobile phones, wireless headsets, personal digital assistants, and MP3 players. For example, Bluetooth is commonly used to network a mobile phone and a wireless headset. Wireless headsets that implement Bluetooth are often referred to as Bluetooth headsets.

OVERVIEW

Because advances in PAN technology allow almost any device to act as a PAN device, no matter how small or mobile the device, a problem arises because such a device may be easily misplaced. This is especially true for devices such as mobile phones, wireless headsets, and personal digital assistants. Because of their mobile nature, they can be easily misplaced at any number of different locations. Therefore, it would be desirable to provide a mechanism for locating a misplaced PAN device.

Described herein is a method and apparatus for assisting a PAN device user in locating a misplaced PAN device. One exemplary embodiment is a PAN device that encounters a triggering event and responsively checks and determines that another PAN device is absent. Upon detecting the absence of the other PAN device (such as by detecting an absence of communication from the other PAN device), the exemplary PAN device presents via a user interface an indication of the time that it last detected presence of the other PAN device. By presenting the time of the last detected presence of the other PAN device, the user of the PAN device may be able to recall where he or she was at that time, which may help the user find the misplaced PAN device, hopefully at that location.

By way of example, the PAN device may be a mobile phone and the other PAN device may be a Bluetooth headset. In this example, the triggering event causing the mobile phone to present the time of the last detected presence of the Bluetooth headset may be the mobile phone powering-on or attempting to communicate with the Bluetooth headset. As another example, the PAN device may be an automobile and the other PAN device may be a mobile phone or a Bluetooth headset. In this example, triggering event may be starting the automobile. Other examples are possible as well.

These and other aspects and advantages of the method and apparatus described herein will become apparent to those of ordinary skill in the art by reading the following detailed description with reference where appropriate to the accompanying drawings.

BRIEF DESCRIPTION OF THE DRAWINGS

Various exemplary embodiments are described herein with reference to the following drawings, wherein like numerals denote like entities.

FIG. 3 is a depiction of a table that can be stored in the data storage of a PAN device;

FIG. 5 is another simplified block diagram depicting two different times of operation of an exemplary PAN device.

DETAILED DESCRIPTION OF THE DRAWINGS

Figure 1:
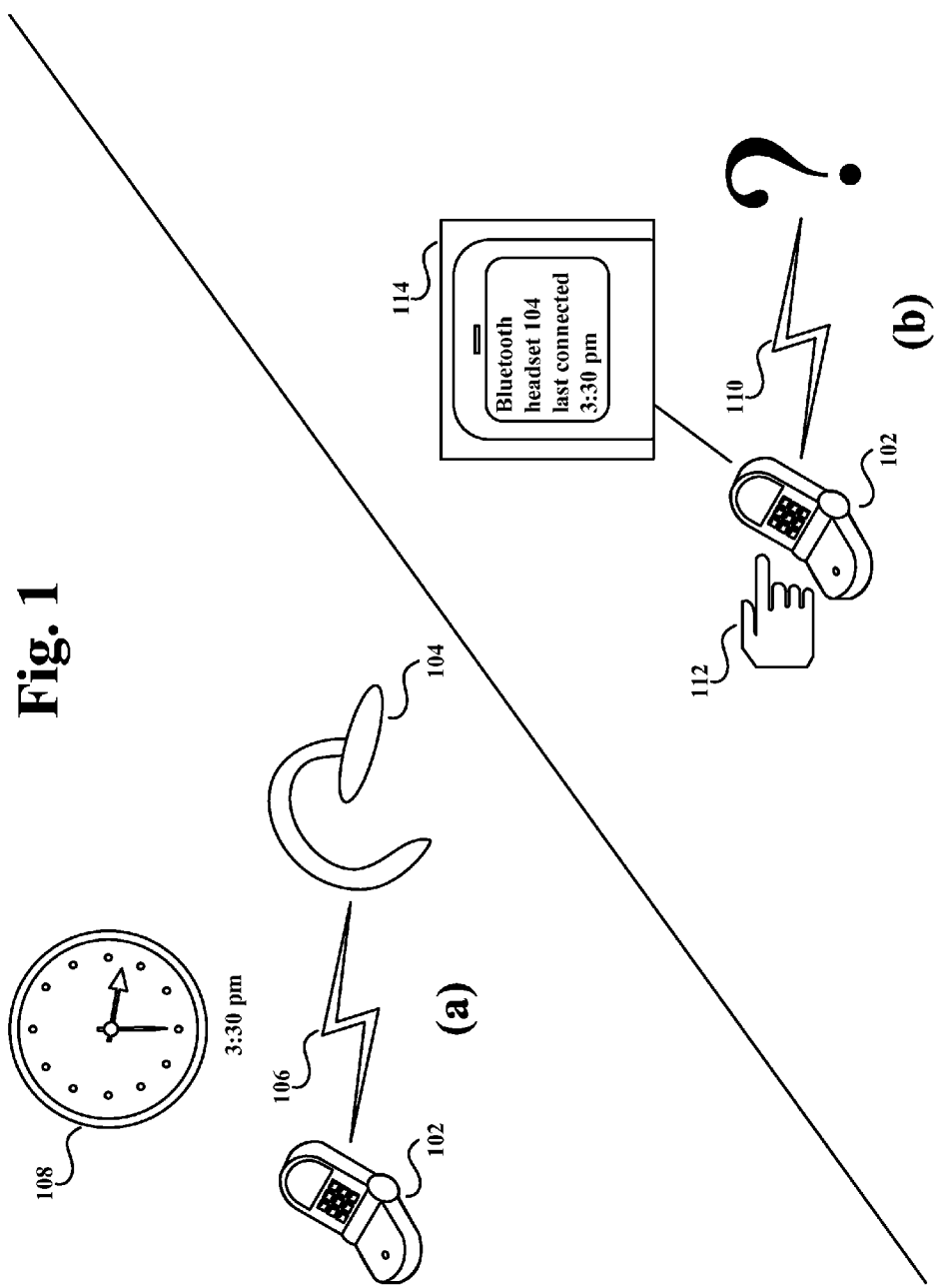
FIG. 1 is a simplified block diagram depicting two different times of operation of an exemplary PAN device.

FIG. 1 is a simplified block diagram depicting the operation of a PAN device at two different points in time in accordance with exemplary embodiments. The figure illustrates PAN device 102 in communication with PAN device 104 at time (a), and illustrates PAN device 102 unable to detect communication of PAN device 104 at time (b). As shown, PAN device 102 is a mobile phone, and PAN device 104 is a Bluetooth headset. The mobile phone is able to communicate with the Bluetooth headset using the Bluetooth protocol.

At time (a), the mobile phone is able to detect the presence of the Bluetooth headset by detecting Bluetooth communication 106 (for example, Bluetooth inquiry response messages, as described below) of the Bluetooth headset. The mobile phone may attempt to detect communication at set intervals, perhaps every few minutes. Time (a) represents a single point in time that the mobile phone was able to detect communication of the Bluetooth headset (in this example, 3:30 pm). The detected communication will likely include the Bluetooth device address (or BD_ADDR, described below) assigned to the Bluetooth headset, which allows the mobile phone to uniquely identify the headset.

Having detected the presence of the Bluetooth headset, the mobile phone stores the time of the detected presence. The mobile phone may store the time of the detected presence each time it detects communication of the Bluetooth headset. In this embodiment, the mobile phone has a data storage and a real time clock (RTC) synchronized with the phone's network provider. As shown in FIG. 1, the current time of day 108 stored in the RTC at time (a) is 3:30 pm. The mobile phone stores the Bluetooth device address and the current time (3:30 pm) of the RTC in the data storage. In this embodiment, the mobile phone overwrites any previously stored time associated with the Bluetooth device address. Therefore, the stored time represents the most recently detected presence of the Bluetooth headset.

At time (b), the mobile phone encounters triggering event 112. As shown, triggering event 112 is the mobile phone receiving a key input—perhaps from the phone's user navigating through a menu or simply powering-on the phone. In response to receiving the key input, the mobile phone detects the absence of the Bluetooth headset by making a determination that the phone is unable to detect Bluetooth communication of the headset. The mobile phone may broadcast an inquiry message 110, expecting that the Bluetooth headset will respond by sending an inquiry response message, and determine that the headset has not responded with a response message.

In response to detecting the absence of the Bluetooth headset, the mobile phone presents the time stored at time (a). In this embodiment, the mobile phone has a display 114, and the phone presents via the display the time stored at time (a), along with an identification of the missing PAN device (in this example, Bluetooth headset 104).

Figure 2:
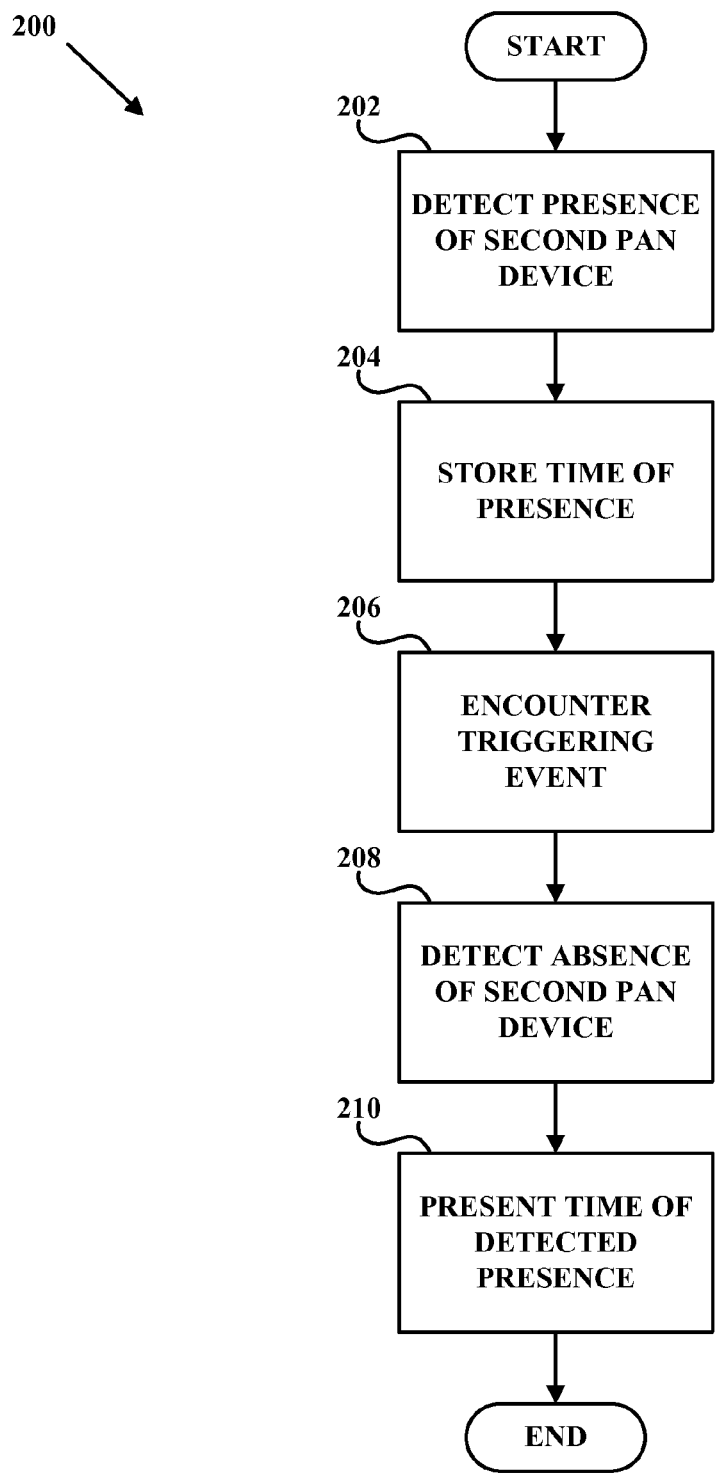
FIG. 2 is a flowchart of a method that can be carried out by a PAN device.

FIG. 2 is a flowchart of a method 200 that can be carried out by PAN device 102 to determine the absence of PAN device 104 and to responsively present the time of the last detected presence of PAN device 104.

At step 202, PAN device 102 detects the presence of PAN device 104. PAN devices 102 and 104 may be any devices capable of carrying out the PAN device functions described herein, and are described in detail below with reference to FIG. 4.

PAN device 102 may perform step 202 multiple times, and several examples of events that would cause PAN device 102 to perform step 202 are possible. As one example, the event could be receiving a key input, perhaps from the phone's user navigating through a menu or simply powering-on the phone. As another example, the event could be the passage of a set period of time. The time period could range from several milliseconds or less to several minutes or more. Other examples of events that would cause PAN device 102 to detect the presence of PAN device 104 are possible as well.

PAN device 102 may detect the presence of PAN device 104 by detecting a communication of PAN device 104. In an exemplary embodiment, PAN device 102 may include a processor and a PAN communication interface. In this embodiment, the processor may detect communication via the PAN communication interface.

Several methods of detecting communication are possible, and while some are described below, other methods are possible as well without departing from the scope of the claims. In one exemplary embodiment, PAN device 102 may detect communication of PAN device 104 subsequent to sending a communication that would cause PAN device 104 to send a responsive communication. For example, PAN device 102 may enter a device discovery state and may broadcast an inquiry message while in the state. Other devices, such as PAN device 104, may also be in a device discovery state and may transmit an inquiry response message in response to receiving the inquiry message. Therefore, detecting communication of PAN device 104 may include detecting an inquiry response message transmitted by PAN device 104, the inquiry response message being transmitted in response to receiving an inquiry message broadcast by PAN device 102.

In another exemplary embodiment, PAN device 102 may detect communication of PAN device 104 by passively detecting communication of PAN device 104, rather than by sending a communication that would cause PAN device 104 to send a responsive communication. For example, rather than PAN device 102 broadcasting an inquiry message while in a discovery state, PAN device 104 may instead broadcast an inquiry message, and PAN device 102 may detect that message.

In still another exemplary embodiment, PAN device 102 may employ a combination of (i) broadcasting inquiry messages and (ii) passively detecting communication of PAN device 104. For example, PAN device 102 may broadcast an inquiry message in response to receiving a key input (or in response to another event) and then detect an inquiry response message sent from PAN device 104, and may subsequently detect inquiry messages (or other communication) sent from PAN device 104.

PAN device 102 may engage in a variety of different types of communication. PAN device 102 may engage in wired or wireless communication, or both. Further, PAN device 102 may communicate using one or more of any variety of protocols, including wired protocols such as universal serial bus (USB) or FireWire, or wireless protocols such as Bluetooth, infrared data association (IrDA), ZigBee communication, ultra-wideband (UWB), or wireless USB (WUSB). Other protocols may be used as well, as the list of possible protocols is not exhaustive. A detailed description of some exemplary PAN protocols is described with reference to FIG. 4.

While detecting communication of PAN device 104 is one method of detecting the presence of PAN device 104, other methods of detecting the presence are possible as well. For example, PAN device 104 may be connected by wire to PAN device 102, and PAN device 102 may detect the presence of PAN device 104 by detecting that the current or voltage of the wire surpasses a certain threshold. As another example, PAN device 104 may contain a radio-frequency identification (RFID) tag and PAN device 102 may contain an RFID scanner. In this example, the RFID scanner may detect the presence of PAN device 104 by detecting that the RFID tag is in proximity to PAN device 102.

At step 204, PAN device 102 stores a time of the detected presence. In an exemplary embodiment, PAN device 102 may contain a real time clock (RTC) for detecting the current time of day. The RTC may be synchronized to a clock set by a network carrier of PAN device 102. In another exemplary embodiment, rather than using an RTC, PAN device 102 may request the current time from an access node such as a base transceiver station (BTS). Other methods of detecting the current time of day are possible as well.

PAN device 102 may also store an identifier of PAN device 104. The inquiry messages, inquiry response messages, and other communications transmitted by PAN device 104 will likely include a device address, which will allow PAN device 102 to uniquely identify PAN device 104. For example, Bluetooth communication transmitted by PAN device 104 will likely include a 48 bit address (referred to as the BD_ADDR), which uniquely identifies the Bluetooth device. Storing the identifier of PAN device 104 with the time allows PAN device 102 to detect the presence and absence of several PAN devices (as described below with reference to FIG. 3).

Additional information may be stored as well at step 204. For example, PAN device 102 may contain a GPS receiver, and may store the location of PAN device 102. Because a PAN by its nature is a short-range network, the stored location of PAN device 102 should approximate the location of PAN device 104. Additionally or alternatively, PAN device 102 may be able to detect and store a remaining battery level of PAN device 104. Storing (and later presenting) the remaining battery level of PAN device 104 may help the user of PAN device 102 to determine why PAN device 102 is no longer able to detect the presence of PAN device 104. For example, if the remaining battery level of PAN device 104 at the time of the most recently detected presence was only 5%, it is possible that the absence of PAN device 104 is because PAN device 104 has no battery power to allow it to communicate with PAN device 102. Other examples of additional information that can be stored are possible as well without departing from the scope of the claims.

In an exemplary embodiment, PAN device 102 has a data storage, and the PAN device stores the time of the detected presence in the data storage. For example, the data storage may contain a flat file database with columns for storing a device identifier and a time. The database may contain additional columns for storing other information such as a location or remaining battery level. An exemplary table is described in detail below with reference to FIG. 3.

PAN device 102 may be configured to store any number of times of the detected presence of PAN device 104. In an exemplary embodiment, PAN device 102 may store the time of each detected presence. Therefore, the data storage of PAN device 102 may store multiple times for any particular device identifier. In another embodiment, the data storage may store only one time for a particular device identifier. In this embodiment, PAN device 102 may overwrite any previously stored time for the device identifier of PAN device 104. Therefore, the single time stored in the data storage for a particular device identifier would represent the time of the most recently detected presence. Other embodiments are possible as well.

At step 206, PAN device 102 encounters a triggering event. The triggering event encountered at step 206 may depend on the type of PAN device 102. In one embodiment, PAN device 102 is a mobile phone. In this embodiment, several example triggering events could be encountered by the mobile phone. First, the triggering event could be the mobile phone receiving a key input—for example, from the user powering-on the phone, entering a telephone number, or navigating a menu using the phone's numerical keypad. Second, the triggering event could be the mobile phone attempting to communicate with PAN device 104, which could be a Bluetooth headset or other device. Third, the triggering event could be the mobile phone attempting to establish a call. The mobile phone may be configured to encounter any combination of the above described triggering events. Additionally, the triggering events are not limited to those described above. For example, the triggering event could simply be the passage of a predetermined amount of time.

In another embodiment, PAN device 102 is an automobile. Several example triggering events could be encountered by the automobile. First, the triggering event could be opening a door of the automobile. Second, the triggering event could be a passenger sitting in a seat of the automobile—perhaps the driver's seat or another seat. Third, the triggering event could be putting a key in an ignition of the automobile. Fourth, the triggering event could be starting the automobile—perhaps by turning a key in an automobile ignition or pushing an ignition button. Other triggering events are possible as well, and the automobile may be configured to encounter any combination of triggering events.

At step 208, PAN device 102 detects the absence of PAN device 104. Detecting the absence of PAN device 104 may comprise PAN device 102 detecting an absence of communication of PAN device 104. For example, PAN device 102 may broadcast an inquiry message and then detect the absence of an inquiry response message from PAN device 104. As another example, rather than sending a communication that would normally cause PAN device 104 to send a responsive communication, PAN device 102 may simply detect that it has not received any communication from PAN device 104 over a certain period of time, perhaps over several milliseconds or even several minutes. Or PAN device 102 may employ a combination of these techniques. Other methods of detecting an absence of communication are possible as well.

Other methods of detecting an absence of PAN device 104 are possible as well. For example, PAN device 104 may be connected by wire to PAN device 102, and detecting the absence of PAN device 104 may comprise detecting that the current or voltage of the wire has dropped below a certain threshold. As another example, PAN device 102 may have an RFID scanner and PAN device 104 may contain an RFID tag, and detecting the absence of PAN device 104 may comprise the RFID scanner detecting that the RFID tag is not in proximity to PAN device 102.

At step 210, in response to detecting the absence of PAN device 104 at step 208, PAN device 102 presents the time of the detected presence of PAN device 104 that was stored at step 204. In an exemplary embodiment, PAN device 102 may retrieve the time stored in the flat file database of FIG. 3 and present that time. PAN device 102 may also present additional information, such as the location and the remaining battery level stored at step 204.

As explained with reference to steps 202 and 204, PAN device 102 may store several times of the detected presence of PAN device 104. At step 210, PAN device 102 may present any of these stored times. For example, the data storage of PAN device 102 may store a first time of detection as 3:25 pm, and a second time of detection as 3:30 pm. In an exemplary embodiment, PAN device 102 presents the time of the most recently detected presence—in this example, 3:30 pm. In another embodiment, PAN device 102 presents an earlier time of detection, perhaps representing the time that PAN device 102 first detected the presence of PAN device 104 after PAN device 102 was powered-on. In this example, that time may be 3:25 pm. PAN device 102 may present other times stored in the data storage as well, and may present one or more of those times.

PAN device 102 can present the time visually, audibly, or in any other manner. In an exemplary embodiment, PAN device 102 has a user interface and presents the time via the user interface. For example, PAN device 102 could be a mobile phone, and the user interface could be a liquid crystal display (LCD) screen. The mobile phone could present the time (and possibly other information) via the LCD screen. As another example, PAN device 102 could be an automobile, and the user interface could be audio system inside the automobile. The automobile could present the time audibly via the audio system. Other methods of presenting the time are possible as well.

FIG. 3 depicts a database table depicting time and other information that may be stored by PAN device 102. As shown, table 300 contains rows 310, 312, 314, and 316, and each row may store information about a respective PAN device. The stored information for a respective PAN device may include a device identifier (ID) in column 302, a time of the most recently detected presence in column 304, a location of the most recently detected presence in column 306, and the battery level of the most recently detected presence in column 308. As shown, table 300 may consist of several populated rows, each of which stores information about a detected PAN device (as shown, rows 310, 312, and 314), and may additionally consist of one or more empty rows for storing information about additional PAN devices that have not yet been detected by PAN device 102 (as shown, row 316).

The device ID stored in column 302 may be any identifier that can uniquely identify a PAN device. As shown, the device ID is the 48 bit address (in the form of a 12 hexadecimal digit number) assigned to each Bluetooth device (referred to as the BD_ADDR). However, the device ID could also be a 32 bit Internet Protocol version 4 (IPv4) address or a 128 bit Internet Protocol version 6 (IPv6) address, or another other address or identifier. Further, the device ID is not limited to a single type of address, but could consist of multiple addresses. For example, the rows of column 302 could contain a mixture of 48 bit Bluetooth addresses, 32 bit IPv4 addresses, and 128 bit IPv6 addresses, and an additional column not shown in table 300 could identify the type of address stored in column 302. Alternatively, rather than identifying the type of address using an additional column, PAN device 102 could identify the type of address based on the length of the address or identifier stored in column 302.

The time of the most recently detected presence stored in column 304 could be any time that can be utilized by PAN device 102 for carrying out the PAN device functions described herein. As such, the time could be stored as a 32 bit Unix timestamp or as a plaintext representation, perhaps using ASCII or UFT-8 encoding. The time may be stored using other formats as well.

The location of the most recently detected presence stored in column 306 could be any location that can be utilized by PAN device 102 for carrying out the PAN device functions described herein. As such, the location could be stored using a geographic coordinate system, as depicted by rows 310 and 312 in column 306. More specifically, the location could be stored using the WGS 84 coordinate system used by the Global Positioning System. Additionally or alternatively, the location could be stored as a street address, a city and state, or a zip code. Other formats for storing the location as possible as well.

The detected battery level of the detected PAN device at the time of the most recently detected presence as stored in column 308 may be represented, for example, as a percentage of total battery power remaining. Additionally or alternatively, the battery level could be represented as the total milliampere-hours (mAh) of total battery power remaining. The battery level may also be stored using other formats, without departing from the scope of the claims.

Figure 4:
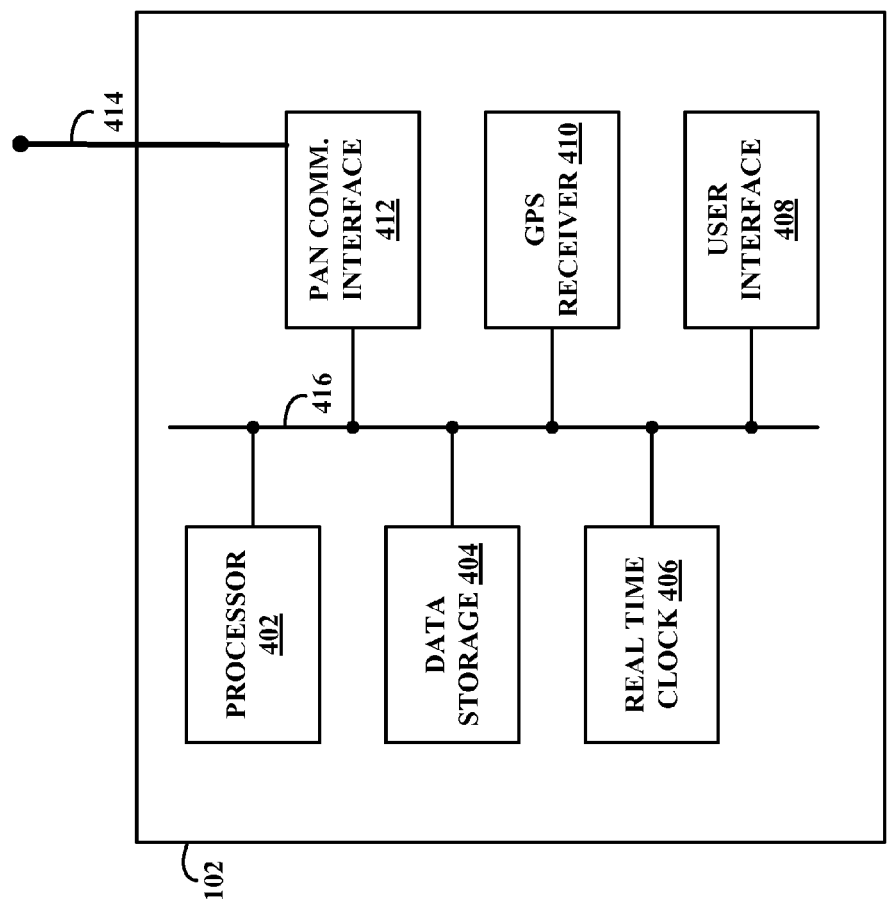
FIG. 4 is a simplified block diagram of a PAN device.

FIG. 4 is a simplified block diagram of an exemplary PAN device. As illustrated, PAN device 102 may include a processor 402, data storage 404, a real time clock (RTC) 406, a user interface 408, a Global Positioning System (GPS) receiver 410, and a PAN communication interface 412 and antenna 414, all coupled together by a system bus 416. Further, PAN device 102 may include any other mechanisms now known or later developed for such devices.

In an exemplary embodiment, processor 402 may be, for example, a general purpose microprocessor and/or a discrete signal processor. Though processor 402 is described here as a single processor, those having skill in the art will recognize that PAN device 102 may contain multiple (e.g., parallel) processors. Processor 402 may interact with other components of PAN device 102. For example, processor 402 may interact with PAN communication interface 404 to detect the presence and/or absence or PAN device 104, for example. Processor 402 may also interact with the data storage to store the time of a detected presence of PAN device 104.

Data storage 404 may store a set of machine-language instructions, which are executable by processor 402 to carry out various functions described herein. Alternatively, some or all of the functions could instead be implemented through hardware. In addition, data storage 404 may store various data to facilitate carrying out various functions described herein, such as table 300 described with reference to FIG. 3. Other information may be stored in data storage 404 as well.

Real time clock (RTC) 406 functions to store a current time of day, and further functions to allow other components connected to the real time clock to retrieve the current time of day. In an exemplary embodiment, real time clock (RTC) 406 may be a stand-alone integrated circuit. In another embodiment, another integrated circuit (perhaps processor 402) may include real time clock 406.

User interface 408 may function to facilitate interaction with a user of PAN device 102. For example, if PAN device 102 is a mobile phone, user interface 408 may include a display (such as an LCD screen), a speaker, a microphone, a key input, and/or a touch-screen. As another example, if PAN device 102 is an automobile, user interface 408 may include a dashboard, an overhead display console, a head-up display (HUD), and/or an audio system. In addition, user interface 408 may include any other components for receiving inputs and/or communicating outputs.

PAN device 102 may include a global positioning system (GPS) receiver 410, which may be any known or later developed GPS receiver, suitable for receiving and decoding GPS signals for location. GPS receiver 410 may also be used for setting the time of real time clock 406, and for other purposes as well.

PAN communication interface 412 may include a chipset suitable for communicating with one or more PAN devices. To facilitate the communication, PAN communication interface 412 may be configured to utilize one or more PAN protocols. The PAN communication interface and PAN protocols may facilitate both wired and wireless PAN communication.

Among the wireless PAN protocols that may be utilized is the Bluetooth protocol. Several Bluetooth specifications have been published, including versions 1.0, 1.0B, 1.1, 1.2, 2.0, 2.1, and 3.0, and PAN communication interface 412 may utilize any of these Bluetooth versions, or any other versions later developed. Additionally, PAN communication interface 412 may utilize other Bluetooth features, such as "Bluetooth low energy," which is a low-power version of the traditional Bluetooth protocol. Another wireless PAN protocol that may be utilized is ZigBee, which is another low-power protocol similar to Bluetooth low energy. Several ZigBee specifications have been published, including versions 1.0 and 2006, and PAN communication interface 412 may utilize these or any other later developed versions of the ZigBee protocol. Other wireless PAN protocols may be used as well, including infrared data association (IrDA), wireless USB (WUSB), and ultra-wideband (UWB), without departing from the scope of the claims.

Among the wired PAN protocols that may be utilized by PAN communication interface 412 is IEEE 1394, including those versions defined by IEEE 1394-1995, IEEE 1394a-2000, and IEEE 1394b-2002. Another wired PAN protocol that may be utilized is universal serial bus (USB), including versions 1.0, 1.1, 2.0, and 3.0. Those having skill in the art will recognize that later developed versions of the IEEE 1394 and USB protocols may be utilized as well, and that other wired PAN protocols may also be used.

PAN communication interface 412 may utilize antenna 414 for wireless PAN communication. Additionally, PAN communication interface 412 may utilize one or more wired input/output (IO) interfaces (not shown in FIG. 4) for wired PAN communication. Among the wired IO interfaces that may be utilized are IEEE 1394 interfaces and USB interfaces. Other interfaces for wired and wireless communication may be used as well.

The components of PAN device 102 described with reference to FIG. 4 may be incorporated into any different number of PAN devices. For example, the components may be included in a mobile phone, a Bluetooth headset, a personal digital assistant, an MP3 player, a personal computer, and even an automobile. Note, however, that this list is not exhaustive. Any other number of devices may be PAN devices if those devices are capable of performing the PAN device functions described herein.

FIG. 5 is another simplified block diagram depicting the operation of a PAN device at two different points in time in accordance with exemplary embodiments. As shown, in the embodiment described with reference to FIG. 5, PAN device 102 is an automobile, and PAN device 104 is a Bluetooth headset.

At time (a), the automobile is able to detect the presence of the Bluetooth headset by detecting Bluetooth communication 106 via a PAN communication interface 412. As described above, the detected communication will likely include the Bluetooth device address assigned to the Bluetooth headset.

Having detected the presence of the Bluetooth headset, the automobile stores the time of the detected presence. In this embodiment, the automobile has a data storage and a real time clock (RTC). The automobile may also contain a GPS receiver, and the real time clock may be synchronized with the time indicated by the received GPS signals. Additionally or alternatively, the real time clock may be manually set by an automobile user. As shown in FIG. 5, the current time of day 108 stored in the RTC at time (a) is 3:30 pm. The automobile stores the Bluetooth device address and the current time (3:30 pm) of the RTC in the data storage.

At time (b), the automobile encounters a triggering event. The triggering event may be starting the automobile. In response to starting, the automobile detects the absence of the Bluetooth headset by making a determination that the automobile is unable to detect Bluetooth communication of the headset. For example, the automobile may broadcast an inquiry message 110 in the manner described with reference to FIGS. 1 and 2. Other methods of detecting the absence of the Bluetooth headset are possible as well, and several examples are described with reference to FIG. 2.

In response to detecting the absence of the Bluetooth headset, the automobile presents the time stored at time (a). In this embodiment, the automobile presents the time audibly (perhaps using an audio system installed in the automobile) with verbal instruction 502, which indicates the time stored at time (a), along with an identification of the missing PAN device (Bluetooth headset 104). Additionally or alternatively, the automobile could present the time audibly using a series of tones. The automobile can also present the time visually on a display inside the automobile—perhaps on a dashboard display.

Several exemplary embodiments have been described above. Those of ordinary skill in the art will appreciate, however, that numerous changes to the embodiments described can be made without departing from the scope of the claims and without deviating from the basic principles of the invention.

We claim:

1. A method comprising:
   a first personal area network (PAN) device detecting a first communication of a second PAN device and storing a time of the first communication;
   subsequent to detecting the first communication, the first PAN device encountering a triggering event;
   upon encountering the triggering event, the first PAN device making a determination that the first PAN device is unable to detect communication of the second PAN device; and
   in response to making the determination, the first PAN device presenting the time of the first communication.

2. The method of claim 1, wherein at least one of the first PAN device and the second PAN device is a device selected from the group consisting of (i) a personal computer, (ii) an automobile, (iii) a mobile phone, (iv) a Bluetooth headset, (v) a personal digital assistant, and (vi) an MP3 player.

3. The method of claim 1, wherein the first PAN device is an automobile, and wherein the second PAN device is a device selected from the group consisting of (i) a mobile phone and (ii) a Bluetooth headset.

4. The method of claim 1, wherein the first PAN device is a mobile phone, and wherein the second PAN device is a Bluetooth headset.

5. The method of claim 1, wherein the first communication is one of (i) universal serial bus (USB) communication, (ii) FireWire communication, (iii) infrared data association (IrDA) communication, (iv) Bluetooth communication, (v) ZigBee communication, (vi) ultra-wideband (UWB) communication, and (vii) wireless USB (WUSB) communication.

6. The method of claim 1, wherein the first communication is a communication addressed to (i) the first PAN device, (ii) a third PAN device, or (iii) a broadcast address.

7. The method of claim 1, wherein the first PAN device is an automobile, and wherein the triggering event is at least one of (i) opening a door of the automobile, (ii) a passenger sitting in a seat of the automobile, (iii) putting a key in an ignition of the automobile, and (iv) starting the automobile.

8. The method of claim 1, wherein the first PAN device is a mobile phone, and wherein the triggering event is at least one of (i) the mobile phone powering-on, (ii) the mobile phone receiving a key input, (iii) the mobile phone attempting to communicate with a Bluetooth headset, and (iv) the mobile phone attempting to establish a call.

9. A first personal area network (PAN) device comprising:
   a processor;
   a PAN communication interface;
   a user interface; and
   data storage,
   wherein the processor detects via the PAN communication interface a presence of a second PAN device and responsively stores in the data storage a time of the detected presence, and
   wherein the processor subsequently detects via the PAN communication interface an absence of the second PAN device and responsively presents via the user interface the time of the detected presence.

10. The device of claim 9, wherein at least one of the first PAN device and the second PAN device is a device selected from the group consisting of (i) a personal computer, (ii) an automobile, (iii) a mobile phone, (iv) a Bluetooth headset, (v) a personal digital assistant, and (vi) an MP3 player.

11. The device of claim 9, wherein the first PAN device is an automobile, and wherein the second PAN device is a device selected from the group consisting of (i) a mobile phone and (ii) a Bluetooth headset.

12. The device of claim 9, wherein the first PAN device is a mobile phone, and wherein the second PAN device is a Bluetooth headset.

13. The device of claim 9, wherein detecting the presence of the second PAN device comprises detecting a first communication of the second PAN device, wherein the first communication is one of (i) universal serial bus (USB) communication, (ii) FireWire communication, (iii) infrared data association (IrDA) communication, (iv) Bluetooth communication, (v) ZigBee communication, (vi) ultra-wideband (UWB) communication, and (vii) wireless USB (WUSB) communication.

14. The device of claim 9, wherein the first PAN device is an automobile, and wherein the processor detects the absence of the second PAN device in response to at least one of (i) opening a door of the automobile, (ii) a passenger sitting in a seat of the automobile, (iii) putting a key in an ignition of the automobile, and (iv) starting the automobile.

15. The device of claim 9, wherein the first PAN device is a mobile phone, and wherein the triggering event is at least one of (i) the mobile phone powering-on, (ii) the mobile phone receiving a key input, (iii) the mobile phone attempting to communicate with a Bluetooth headset, and (iv) the mobile phone attempting to establish a call.

16. The device of claim 9, further comprising a global positioning system (GPS) module, wherein responsively storing the time comprises storing a location detected by the GPS module, and wherein responsively presenting the time comprises presenting the location.

17. A method comprising:
an automobile detecting a first presence of a wireless personal area network (PAN) device in the automobile and storing a time of the first presence;
subsequent to detecting the first presence, the automobile detecting a triggering event;
in response to detecting the triggering event, the automobile detecting an absence of the device in the automobile; and
in response to detecting the absence, the automobile presenting the time of the first presence.

18. The method of claim 17, wherein the wireless PAN device is a Bluetooth device.

19. The method of claim 18, wherein the Bluetooth device is one of (i) a personal computer, (ii) a mobile phone, (iii) a Bluetooth headset, (iv) a personal digital assistant, and (v) an MP3 player.

20. The method of claim 18, wherein the triggering event is at least one of (i) opening a door of the automobile, (ii) a passenger sitting in a seat of the automobile, (iii) putting a key in an ignition of the automobile, and (iv) starting the automobile.

21. The method of claim 18, wherein presenting the time of the first presence comprises at least one of (i) presenting the time visually on a display in the automobile and (ii) presenting the time audibly.

* * * * *